March 17, 1931. A. McCALL 1,796,529
JOINT OR COUPLING FOR AIR DUCTS
Filed Dec. 5, 1924
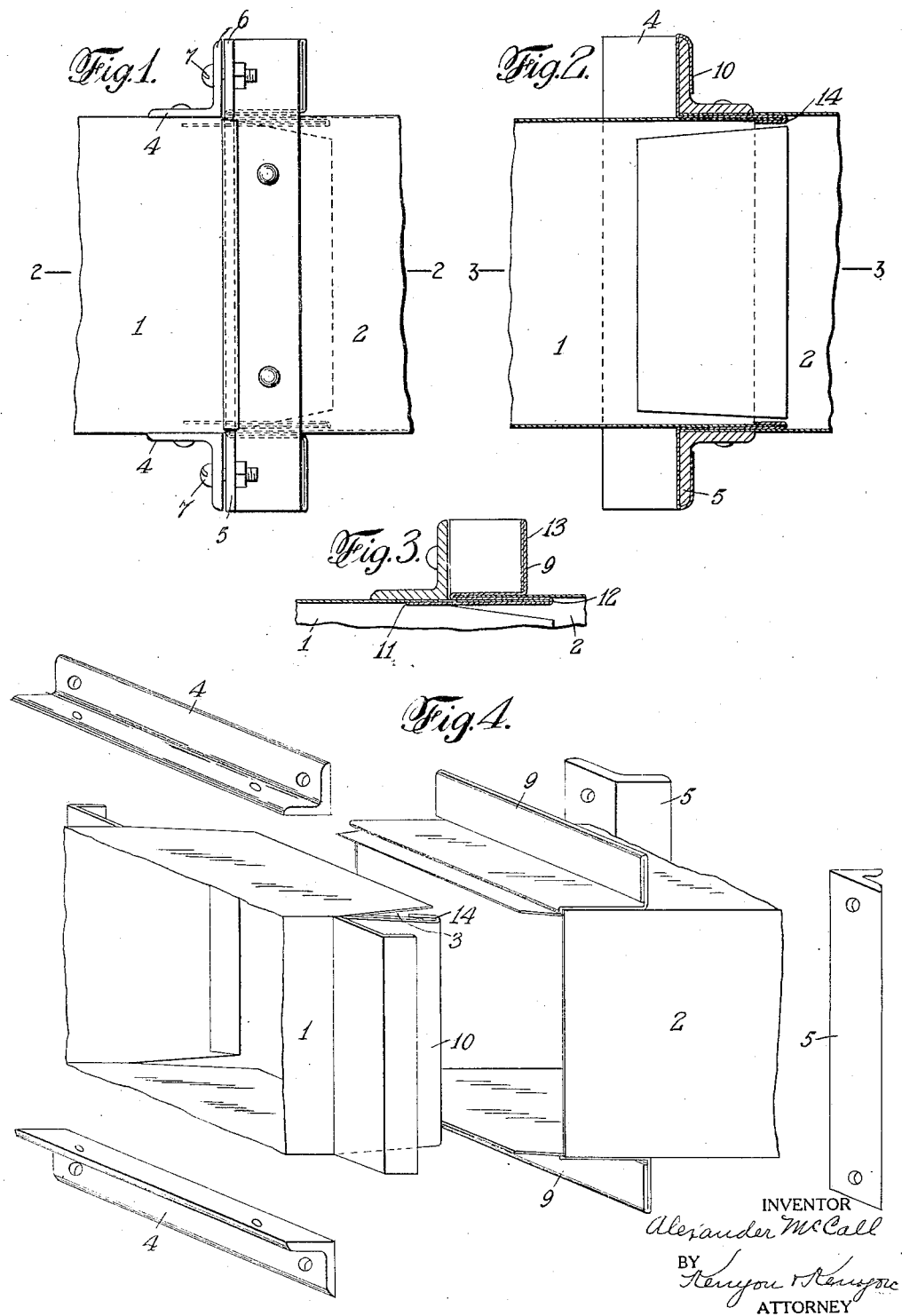

Patented Mar. 17, 1931

1,796,529

UNITED STATES PATENT OFFICE

ALEXANDER McCALL, OF BROOKLYN, NEW YORK

JOINT OR COUPLING FOR AIR DUCTS

Application filed December 5, 1924. Serial No. 754,027.

This invention relates to improvements in the art of joints or couplings for air ducts particularly of heating and ventilating pipes.

One object of the invention is to provide a coupling which will permit rapid coupling of the sections of a heating or ventilating duct.

Another object is to provide a tight joint which will not permit the contents of the duct to escape. A further object is to so arrange the parts as to prevent the duct or conduit from sagging. This applies particularly to the horizontal section of the conduit. Other objects will appear as the description proceeds. Referring now to the drawings, Fig. 1 shows in side elevation a completed joint formed according to my invention.

Fig. 2 is a section thereof on the line 2—2 of Fig. 1.

Fig. 3 is a section of the portion of the duct on the line 3—3 of Fig. 2, and

Fig. 4 is a perspective of the various parts of the joint in separated relation.

In air conduits of the type referred to it has long been considered desirable to have a mechanism for connecting the sections of air conduits and the like which requires as little work at the time of installation as is possible. With this object in view and without losing sight of the requisites of the finished joint I have developed the coupling hereinafter described in detail.

The sections 1 and 2 of the air conduit or duct which are to be secured together are first slit at the corners as at 3 in order to facilitate moving the parts into assembled relation. Angle irons 4 are secured to the opposite sides of one of the ducts and similar angles 5 are secured to the remaining sides of the other. Any suitable means may be used to secure the angle irons to the conduit members, it being deemed preferable to use rivets or bolts as in the embodiment shown. The angles 4 and 5 are made of sufficient length to provide the overlapped ends 6 which may be secured together by any suitable means as by bolts 7 shown in Fig. 1. The coupling members 4 and 5 when assembled in this manner form a rigid re-enforcing frame encircling the conduit which frame is easily secured to any suitable hangar to secure the conduit to the frame of the structure in which it is being installed. In order to minimize the leakage around the joint and to further re-enforce the conduit at this point the bar slip or slip couplings 9 and 10 are provided. The slip coupling 9 shown clearly in Fig. 3 is formed with one part thereof S-shaped whereby to form pockets 11 and 12 to receive the overlapped ends of the sections of conduit to be secured together. This bar slip has the upstanding re-enforcing rib 13 for a purpose to be hereinafter referred to. The slip coupling 10 is formed with a pocket 14 to receive the end of the air duct, the coupling being extended so that it can be bent around an angle bar to secure it from displacement. The slip couplings 9 and 10 are arranged to be passed over the ends of the sides of the duct not occupied by the angle bars 4 and 5. The slip coupling 9 with the independent re-enforcing rib is intended for use upon the horizontal sides of the duct. These sides are ordinarily made considerably larger than the vertical sides of the duct so that it is necessary that all of these horizontal portions should be re-enforced. It will be observed that the angle irons 4 are rigidly secured to and re-enforce the two horizontal sections of the pipe section 1 and that the slip couplings 9 by means of the re-enforcing rib 13 and pocket 12 adequately support the two horizontal sections of the pipe section 2. There is accordingly provided a tight non-sagging joint wherein the horizontal parts of each duct section are supported by an outstanding flange. The parts are easily assembled since the bar slips or slip couplings may be slipped onto the end sections of the duct not occupied by the rigid angle irons, then the slit end of duct which is to be passed inside the other pressed against the lip which forms the pocket 11 and the parts are drawn together and secured in place by means of the overlapping ends of the angle bars.

It is obvious that this invention is not limited to use with a rectangular duct but that it may be applied to other shapes by suitably forming the angle irons and slip couplings.

For example, hexagonal or octagonal ducts could with equal facility be formed as above described in detail with relation to a rectangular duct.

While I have shown and described a specific embodiment of my invention it is obvious that changes may be made therein and that I am to be limited only as set forth in the appended claims.

What I claim and desire to secure by Letters Patent is:

1. In combination with two ducts adapted to be connected, coupling members secured to each of said ducts, means for securing said coupling members to each other, and a plurality of pocket-forming slip couplings arranged between the adjacent ends of the said ducts and secured in place by said coupling members.

2. In combination with two ducts adapted to be connected, coupling members secured to each of said ducts, means for securing said coupling members to each other, and slip couplings arranged between the adjacent ends of the said ducts and secured in place by said coupling members, certain of said slip couplings being formed with a return-bent rib for supporting a portion of said duct.

3. A mechanism for securing together the sections of an air duct, comprising securing members arranged at intervals upon alternate portions of said duct, means for securing the said alternate sections together to form a securing frame encircling the duct, and slip couplings arranged upon each of said ducts and alternated with the securing members thereon.

4. In combination with two rectangular ducts, means for securing said ducts together, said means comprising a rectangular frame encircling said duct, and slip couplings adapted to cooperate with said frame and formed with pockets to receive the adjacent ends of said duct, certain of said slip couplings having a vertically arranged supporting section arranged adjacent to the pocket carried thereby.

5. A mechanism for coupling the ends of duct members comprising angle bars secured to the opposite sides of each duct, said angle bars being alternately arranged on each of the ducts, slip couplings having recesses adapted to receive the ends of the duct members, said slip couplings being arranged on the sides of each duct which are not occupied by said angle bars, certain of said slip couplings being provided with re-enforcing ribs projecting from the part thereof forming the recesses, and means to secure the two sets of angle bars together.

In testimony whereof, I have signed my name to this specification.

ALEXANDER McCALL.